(12) United States Patent
Charleston

(10) Patent No.: US 6,801,005 B2
(45) Date of Patent: Oct. 5, 2004

(54) METHOD AND APPARATUS FOR CONTROLLING THREE-PHASE POWER

(75) Inventor: Bruce Donald Charleston, Spring Lake, MI (US)

(73) Assignee: Load Logic, Inc., Muskegon, MI (US)

( * ) Notice: Subject to any disclaimer, the term of this patent is extended or adjusted under 35 U.S.C. 154(b) by 15 days.

(21) Appl. No.: 10/280,901

(22) Filed: Oct. 25, 2002

(65) Prior Publication Data

US 2003/0090222 A1 May 15, 2003

Related U.S. Application Data

(60) Provisional application No. 60/343,720, filed on Oct. 26, 2001.

(51) Int. Cl.[7] .............................. H02P 5/28; H02P 23/00
(52) U.S. Cl. ........................ 318/438; 318/812; 318/729
(58) Field of Search ................................ 318/700, 701, 318/727, 729, 767, 778, 254, 798, 801, 803, 805, 809, 810, 812, 434, 800, 438, 439, 789, 768; 363/37, 40, 89, 98, 132

(56) References Cited

U.S. PATENT DOCUMENTS

| | | | | |
|---|---|---|---|---|
| 4,446,414 A | * | 5/1984 | Tupper ........................ 318/723 |
| 4,449,087 A | * | 5/1984 | Lippitt et al. ............... 318/723 |
| 4,767,975 A | * | 8/1988 | Unsworth .................... 318/729 |
| 5,450,306 A | * | 9/1995 | Garces et al. ................. 363/41 |
| 5,739,650 A | * | 4/1998 | Kimura et al. .............. 318/254 |
| 5,969,491 A | * | 10/1999 | Viti et al. .................... 318/254 |
| 5,977,741 A | * | 11/1999 | DeLange et al. ........... 318/801 |
| 6,281,658 B1 | * | 8/2001 | Han et al. .................... 318/729 |
| 6,489,742 B2 | * | 12/2002 | Lumsden .................... 318/727 |
| 6,567,283 B2 | * | 5/2003 | Welches ....................... 363/89 |
| 6,636,011 B2 | * | 10/2003 | Sadasivam et al. ......... 318/727 |
| 6,690,593 B2 | * | 2/2004 | Kimura et al. .............. 318/801 |

* cited by examiner

Primary Examiner—David Martin
Assistant Examiner—Eduardo Colon Santana
(74) Attorney, Agent, or Firm—Warner Norcross & Judd LLP

(57) ABSTRACT

A method and apparatus for controlling the supply of three-phase power by calculating phase trigger firing delays for all six zero-crossing points based on the measurement of one zero-crossing point of one phase. The method includes the steps of (a) measuring the zero-crossing point of a single phase, (b) calculating the timing of phase triggers for all phases based on this measurement, and (c) firing the phase triggers based on the calculated sequence timing. In one embodiment, the invention provides power factor correction to the system by measuring power factor to determine whether it is within predetermined limits and introducing a delay into the timing of the phase triggers if it is not. In another embodiment, the invention balances the voltage of the three separate phases by introducing a delay based on comparisons between each of the separate phases.

10 Claims, 9 Drawing Sheets

METHOD AND APPARATUS FOR CONTROLLING THREE-PHASE POWER

BACKGROUND OF INVENTION

This application claims the benefit of U.S. Provisional Patent Application No. 60/343,720, filed Oct. 26, 2001 and entitled POWER CONTROL SYSTEM AND METHOD.

The present invention relates to power control systems and, more specifically, to a method and apparatus for controlling the supply of three-phase power to a three-phase motor.

Three-phase power motors are frequently used in applications that require increased power and efficiency. In a three-phase power system, three phases of power are delivered to the motor along three separate wires. Because the sine waves for each phase are 120 degrees apart, when the current or voltage of one phase is at zero the other two phases are still supplying power. Further, since the power supply to the motor is the sum of the power of the three phases, the power to the motor is constant at all times.

One of the primary reasons for using a three-phase power system is to reduce energy consumption. A three-phase motor requires significantly less power to operate than a comparable single-phase motor. These power savings can be reduced, however, by variations in the voltage supply to the motor. Voltage imbalances between the three phases are common, and largely due to variations on the part of the utility lines supplying the power.

A significant problem with the use of three-phase motors is that they are designed to work most efficiently at rated loads. When varying loads are applied to the motor, a significant amount of power is wasted by the system. Specifically, the motor continues to draw current based on the applied voltage to the motor even when the motor is under no load. As a result, it is desirable to have a control system that decreases the voltage to the motor when the motor is unloaded or only partially loaded.

Power control systems are widely known in the electronics field. These systems generally use measurements of current and voltage to control the motor. The current and voltage of a particular motor are used to calculate a power factor. The value of the calculated power factor is then compared with a target power factor value stored in the system. If the two do not agree, the voltage of the motor is adjusted and the power factor is recalculated. This cycle continues until the two values are the same.

Methods have been developed in the past for controlling the power in three-phase power systems. Generally, these methods require current to be measured separately for each phase. Since current is sinusoidal in three-phase motors, there will be points when the current for each phase is zero. These prior art control methods base operational decisions on the points when current is equal to zero, or the zero-crossing points. Since each cycle will have two such points, the prior art methods generally have six points per cycle where delays are calculated.

These prior art systems have at least one serious limitation, however. In a three-phase system, any variation in one phase will alter the current zero-crossing points in the other two phases. Variations in the incoming power system typically found in an industrial environment in the form of electrical noise, droops, and surges on a single phase will alter delays calculated for power factor correction. These individual phase variations consequently result in instability in the three-phase system. For example, a delay of phase one is calculated based on its zero-crossing point. This power factor correction delay for phase one when applied to the zero crossing of phase two, which has been perturbed by an electrical disturbance will effect the next calculation for phase one. When this incorrect power factor correction calculation is applied the systems tend to oscillate. Therefore, instability is introduced into the system. To prevent this instability, these types of prior art systems respond slowly to load changes, which can significantly reduce the applicability of these systems with motors that have sudden load changes.

It is therefore desirable to have a three-phase power control system with limited instability that can be used in motors that experience sudden load changes. It is further desirable to have a three-phase power control system which is responsive to voltage imbalances and which adjusts for such imbalances.

SUMMARY OF THE INVENTION

The aforementioned problems are overcome by the present invention which provides a method for controlling the supply of three-phase power to a three-phase motor by calculating phase trigger firing delays for all six zero-crossing points based on the measurement of one zero-crossing point of one phase. The method includes the general steps of (a) measuring the zero-crossing point of a single phase, (b) calculating the timing of the phase triggers for all three phases based on this single phase measurement, and (d) firing the phase triggers for all three phases based on the calculated sequence timing. To provide power factor correction, the present invention may further include the steps of (a) measuring power factor to determine whether it is within predetermined limits and (b) if the power factor is not within predetermined limits, introducing a delay into the timing of the phase triggers for all three phases.

In one embodiment, the method further includes steps for balancing the voltage of the three separate phases. In this embodiment, the method further includes the steps of (a) measuring the voltage for each phase on the supply side, (b) comparing the measured values and (c) adjusting the timing of each phase trigger to account for voltage imbalances in the supply lines.

The present invention further provides a power control system for controlling the supply of three-phase power. In one embodiment, the system generally includes a series of phase triggers for controlling the supply of three-phase power, a zero-crossing detector for detecting a zero-crossing point of the voltage of a single phase, a microprocessor for calculating the timing of the firing sequence for all of the phase triggers based on the timing of the detected zero-crossing of a single phase and for firing the phase triggers in accordance with the calculated firing sequence.

In one embodiment, the system also includes a zero-crossing detector for detecting the zero-crossing point of the current. In this embodiment, the microprocessor is programmed to determine the power factor based on the measured timing of the current and voltage zero-crossings. The microprocessor is further programmed to reduce the voltage applied to the motor by introducing a delay into the timing of the phase triggers if the power factor does not satisfy predetermined criteria.

In a further embodiment, the system includes phase balancing components that function to provide a degree of balance to the three phases presented to the motor. In this embodiment, the system includes a converter on each phase for converting the current into a DC voltage. The system further includes a plurality of comparators for comparing the voltages of the three phases. The microprocessor is programmed to monitor the output of the comparators and, if the imbalance falls outside of predetermined limits, introduce delay (or additional delay) into the timing of the firing of the phase triggers to move all three phases toward balance.

In one embodiment, the phase balancing components include a deadband operator that permits the phase balancing components to introduce a balancing delay only when predetermined characteristics have been satisfied. In one embodiment, the deadband operator is embodied within the microprocessor. In this embodiment, the microprocessor is programmed to track the number of cycles during which the voltage of one phase exceeds another, and to introduce a delay only when this number exceeds a predetermined value. Accordingly, the phase balancing components can purposeful ignore momentary imbalances caused by transient events.

The present invention provides a simple and effective method and apparatus for providing control of three-phase power with increased stability and efficiency. The increased stability allows the invention to be used in systems that experience sudden load changes. The increased efficiency decreases the overall power consumption of the motor.

These and other objects, advantages, and features of the invention will be readily understood and appreciated by reference to the detailed description of the preferred embodiment and the drawings.

DETAILED DESCRIPTION OF THE PREFERRED EMBODIMENT

Figure 1:
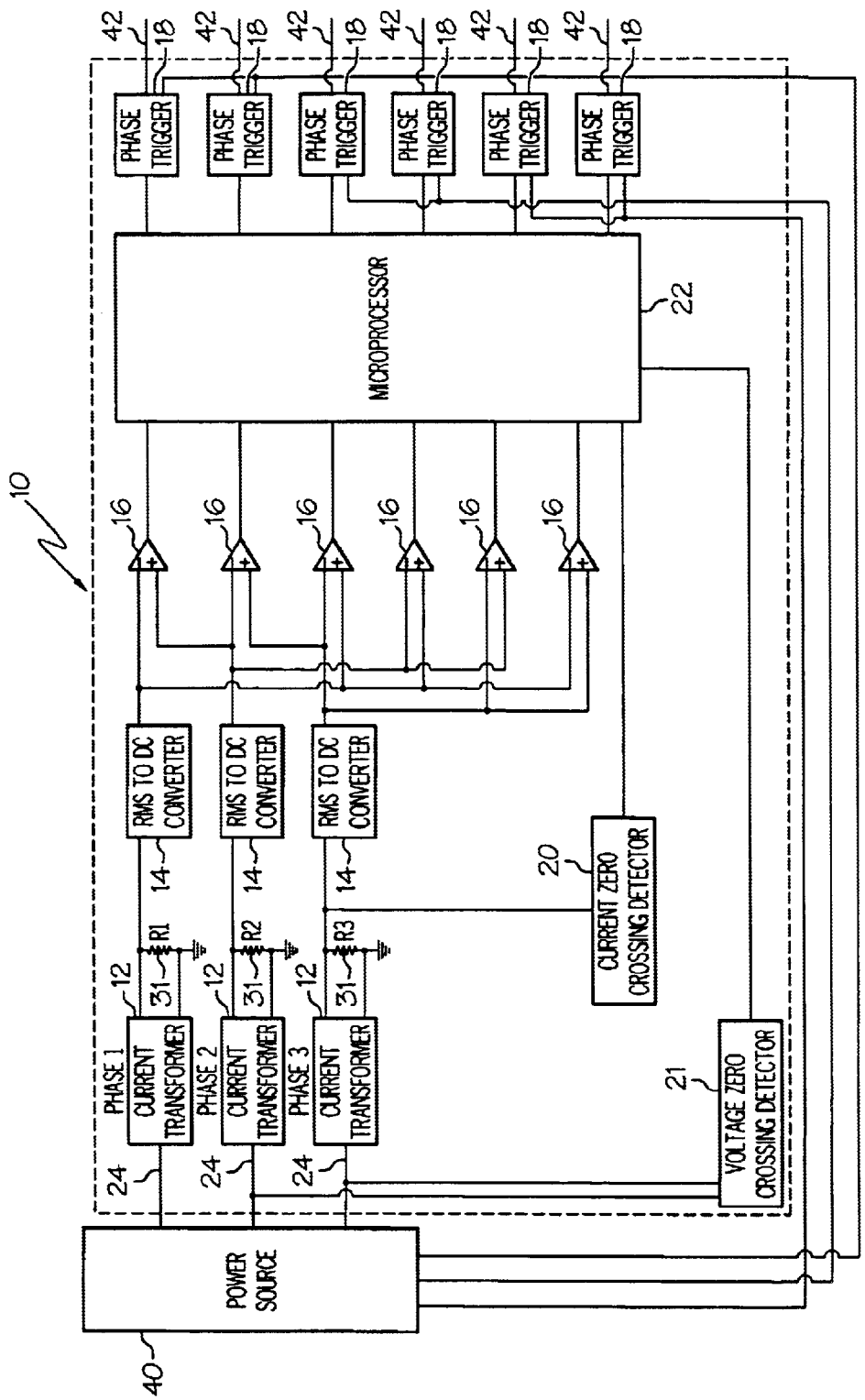
FIG. 1 is a block diagram showing a power system controller according to preferred embodiment of the invention.

A three-phase power control system 10 in accordance with a preferred embodiment of the present invention is shown in FIG. 1. As will be explained more fully below, the system 10 uses the information from one zero-crossing point per cycle of three-phase power to calculate firing delays for phase triggers 18 (e.g. phase control switches) to balance the phases of a three-phase power motor. As can be seen from FIGS. 3–6, variations in both turn-on time of the appropriate phases and phase imbalance from the power source vary the zero-crossing points of the system. Because previous inventions based firing delay calculations for each phase on the zero-crossing points for that phase, each phase having its own timing and imbalance variations, a great deal of instability existed in those systems. The present invention is inherently more stable than the traditional systems because it uses only one zero-crossing point per cycle. Although the invention will be described in relation to a typical three-phase motor, it will be readily understood by those skilled in the art that the invention can be used with a variety of multi-phase power systems. Further, unless otherwise specified all components are electrically connected such that voltage and/or current can be transmitted between them. Many conventional methods exist for electrically connecting components, such as connecting the components with electrical wiring.

The system 10 is generally comprised of a controller 15 having three current transformers 12, three RMS to DC converters 14, six comparators 16, a current zero-crossing detector 20, a voltage zero-crossing detector 21 and a microprocessor 22. The phase triggers 18 are connected to the controller 15. Each of the three current transformers 12 is connected to a converter 14. Each of the converters 14 is connected to four of the six comparators 16, each comparator being connected to the microprocessor 22. The microprocessor 22 is connected to the six phase triggers 18 and to the zero-crossing detectors 20 and 21.

Figure 2:
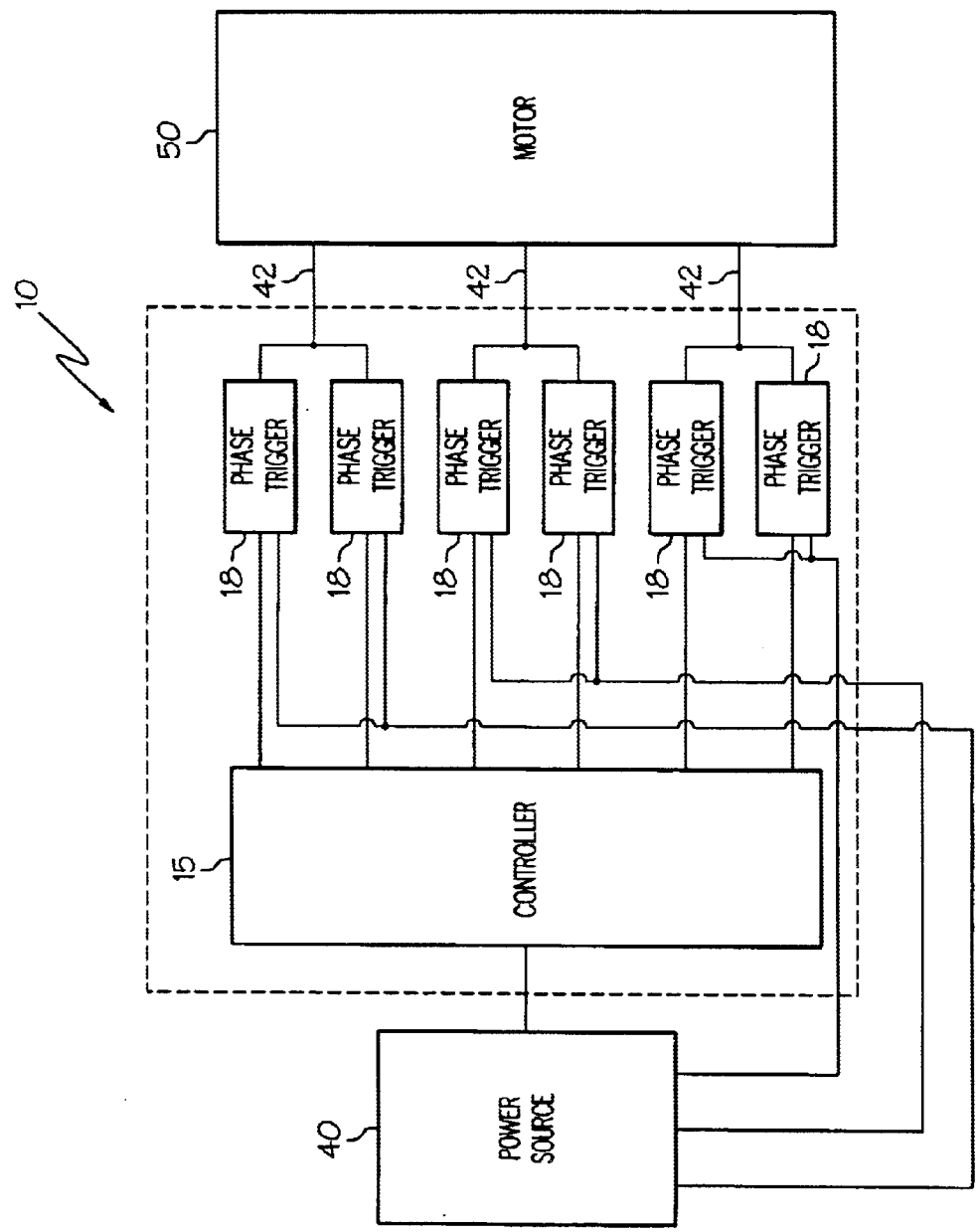
FIG. 2 is a block diagram showing a system incorporating the controller.
Figure 3:
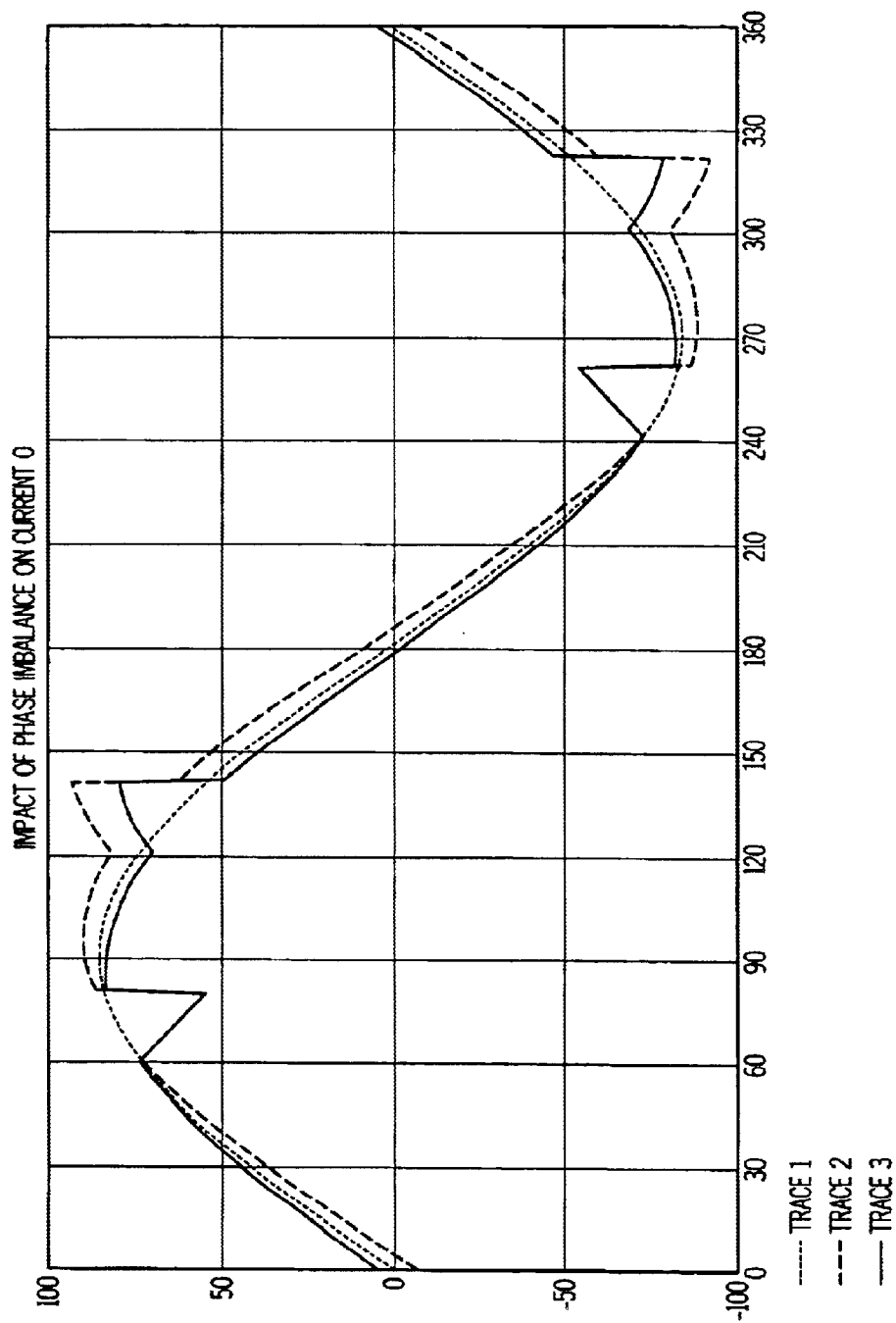
FIG. 3 is a graph of the output of a three-phase system showing phase imbalance.
Figure 4:
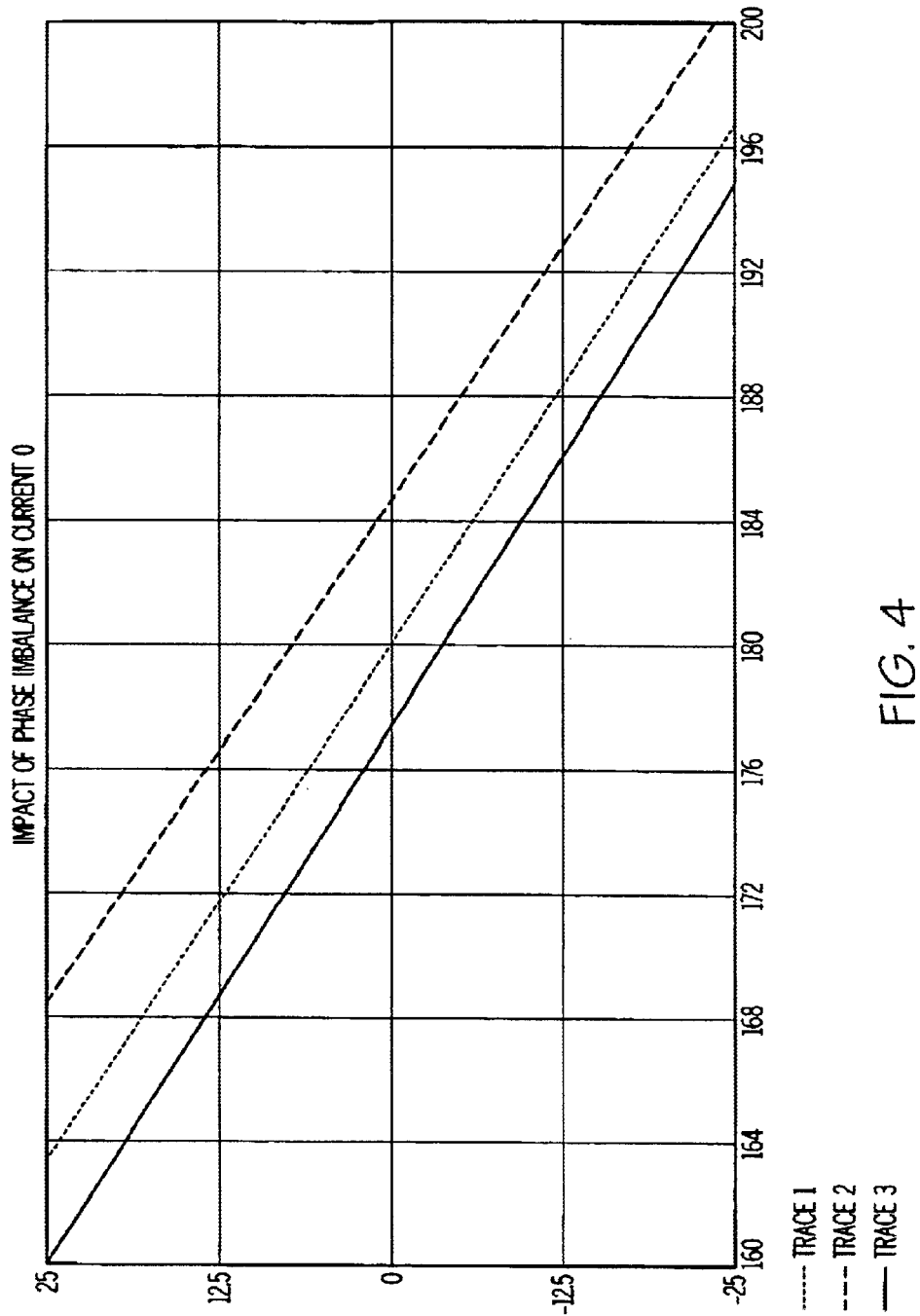
FIG. 4 is an enlarged view of a portion of the graph in FIG. 3.
Figure 5:
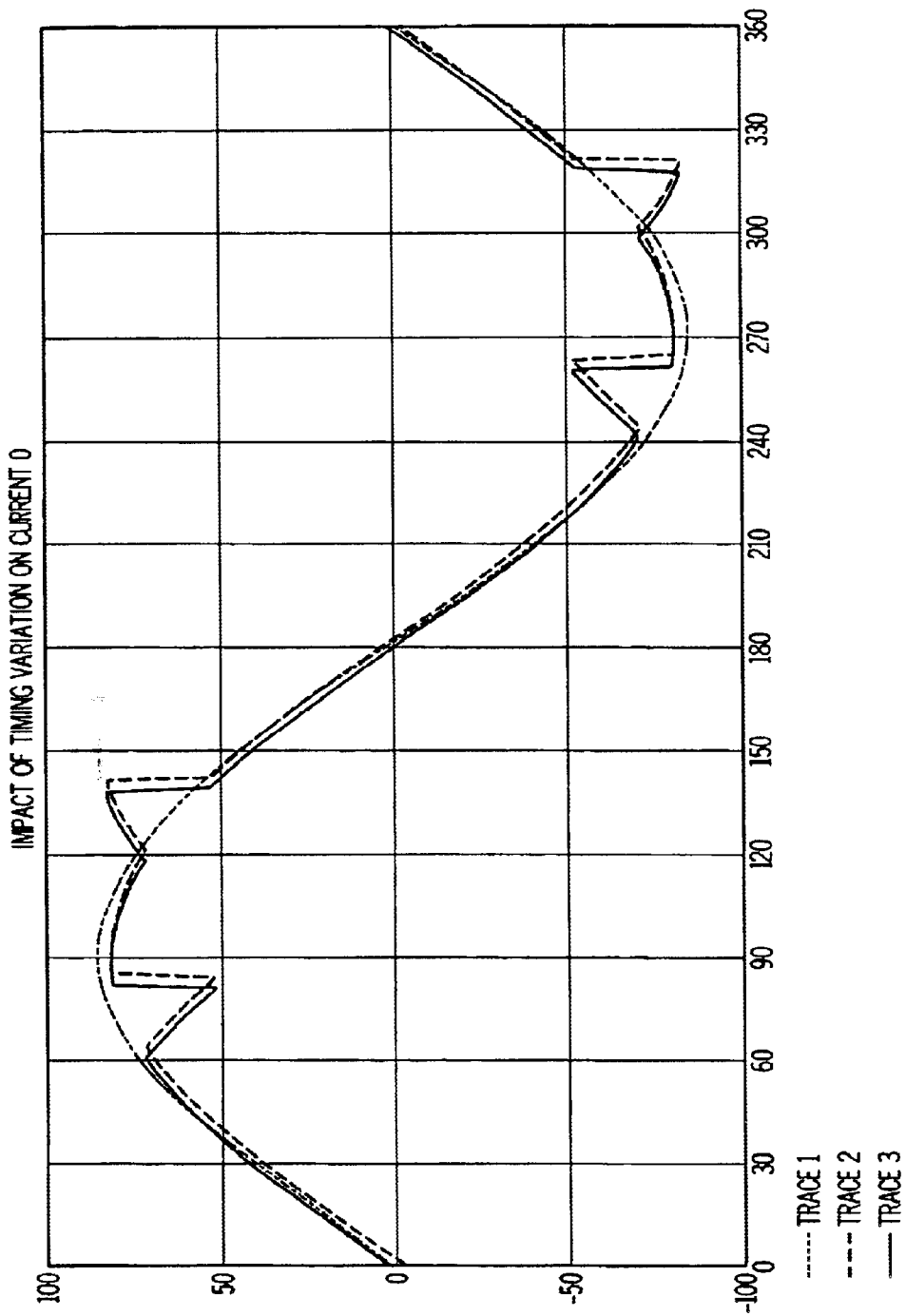
FIG. 5 is a graph of the output of a three phase system showing timing variation.
Figure 6:
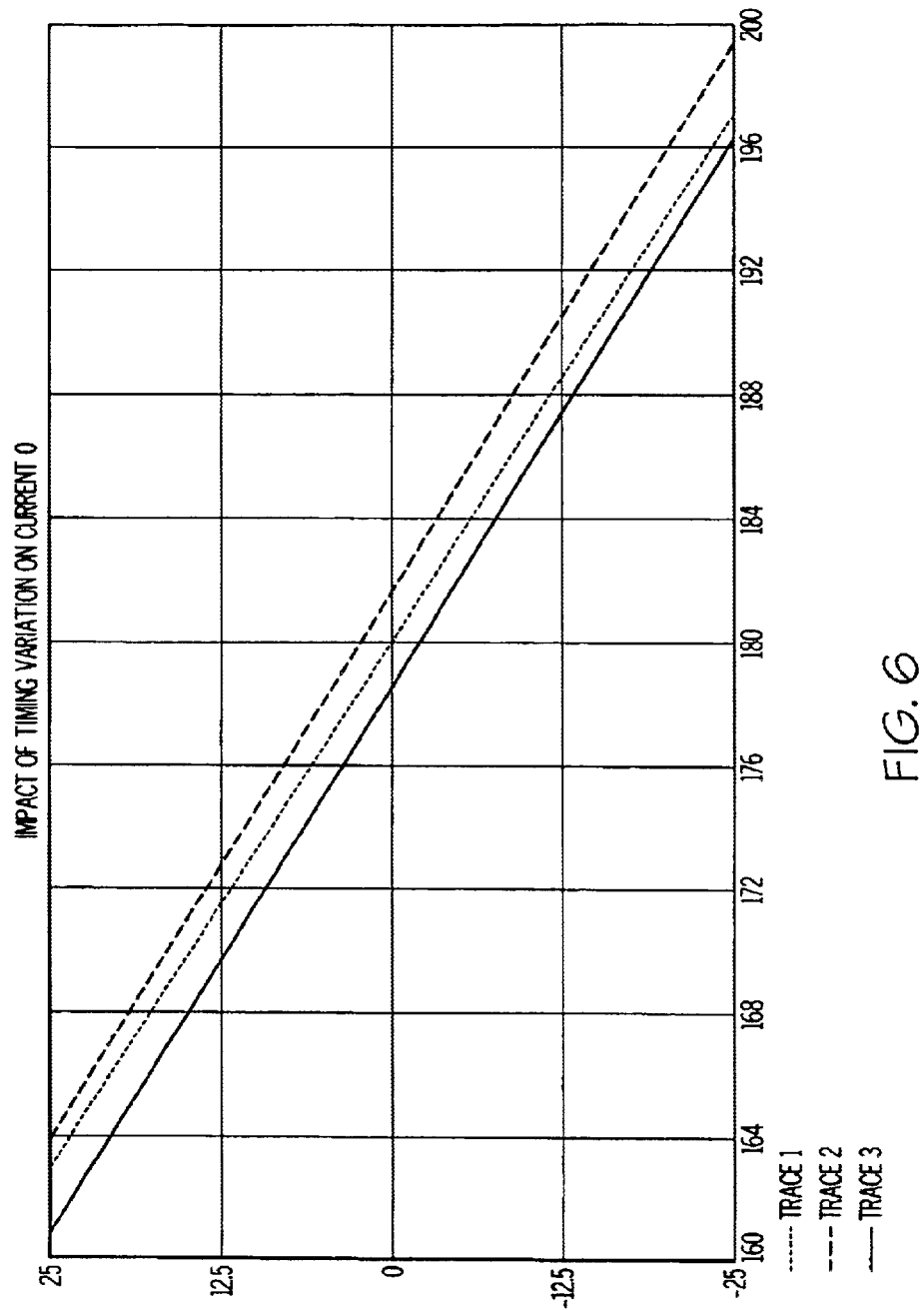
FIG. 6 is an enlarged view of a portion of the graph on FIG. 5.

The system 10 will now be described in more detail with reference to FIGS. 1 and 2. The system includes three phase inputs 24, each phase input 24 electrically connected a current transformer 12 and the power source 40 such that the output current from each phase of the power source 40 is transmitted through a current transformer 12. These current transformers 12 are devices that convert a current to a DC voltage across a resistor. Many current transformers are commercially available and widely known and used in the art.

In addition to being connected to a current transformer 12, one of the phase inputs 24 preferably is electrically connected to the current zero-crossing detector 20 and two of the phase inputs are preferably connected to the voltage zero crossing detector 21. In an alternative embodiment the zero-crossing detectors 20,21 can be connected to the system 10 at any point that allows each zero-crossing detector 20,21 to monitor the appropriate number of phases.

Figure 8:
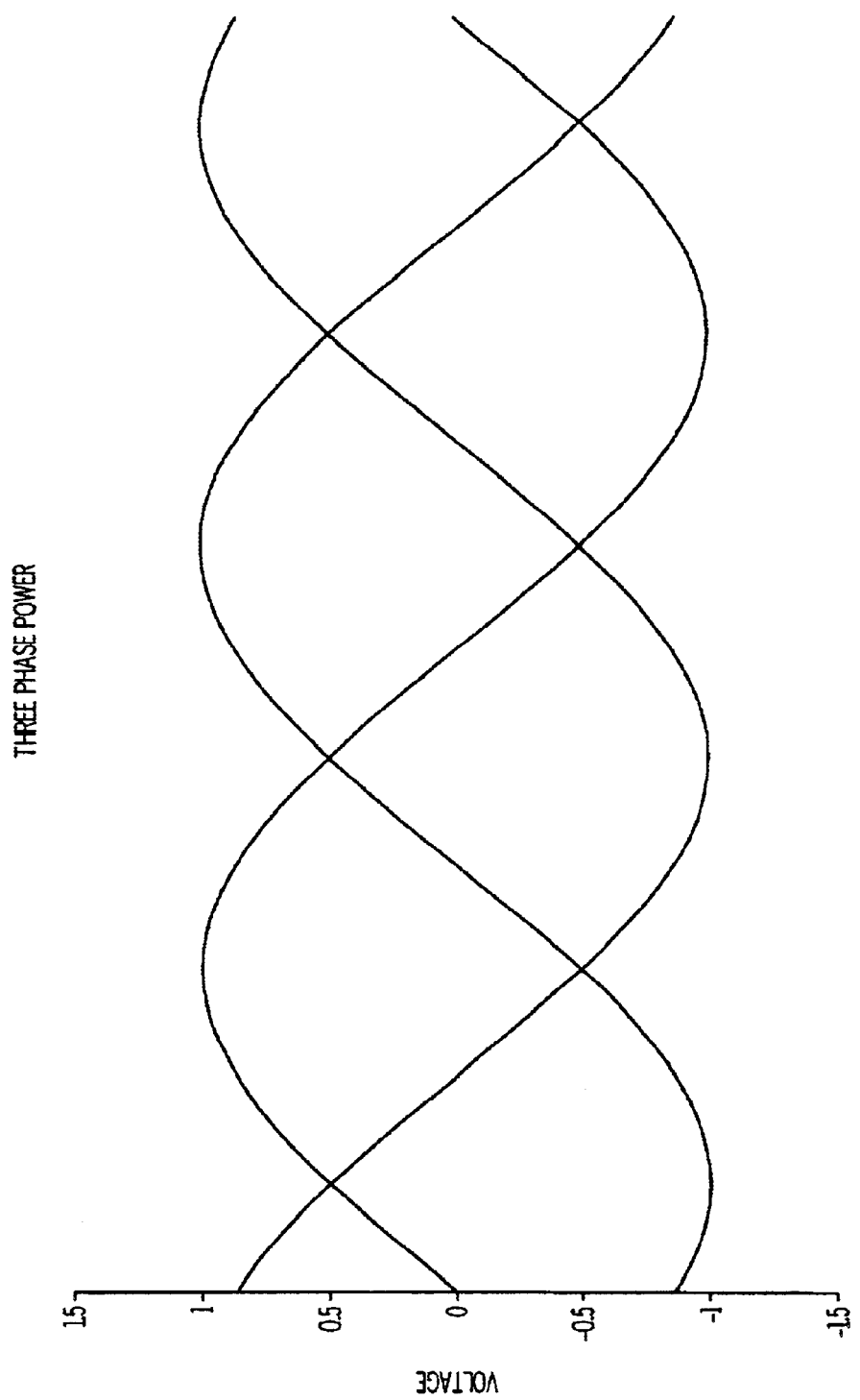
FIG. 8 shows the output of a typical three-phase power source.

As can be seen from FIG. 8, each phase of the power source 40 produces a voltage in the form of a sinusoidal wave. Each full wave has a voltage equal to zero at two points. Each of these two points is termed a zero-crossing point. The current zero-crossing detector 20 monitors the current transmitted from the phase to which it is connected for the zero-crossing points of that phase. The voltage zero-crossing detector 21 monitors the voltage transmitted between two phases to which it is connected for the zero crossing points of the combination of the two phases. Zero-crossing detectors are widely used in the art and any commonly available detector can be used in the present invention. In a preferred embodiment, only one current zero-crossing detector 20 is used and only one voltage zero-crossing detector 21 is used.

Figure 7:
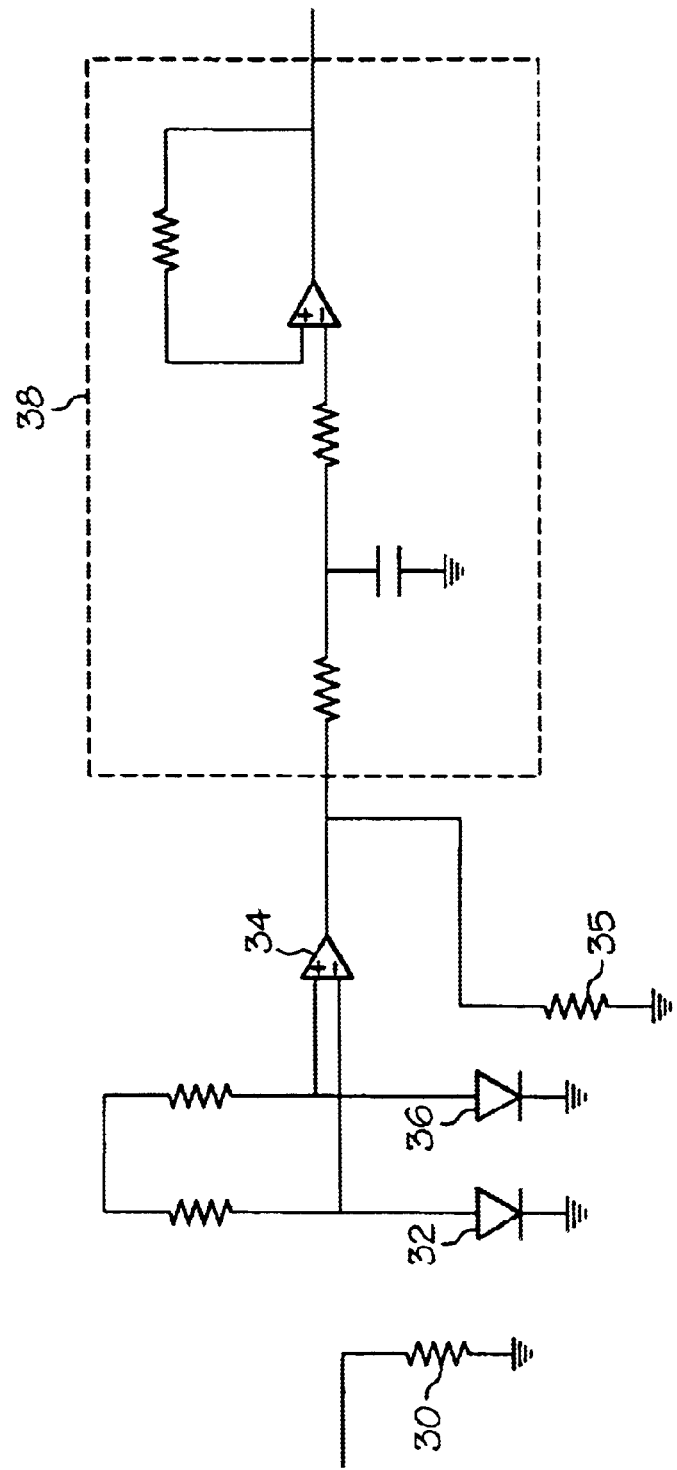
FIG. 7 is a circuit diagram of a simplified voltage converter of the controller.

Each current transformer 12 is electrically connected to an RMS to DC converter 14. A ground reference 31 is optionally connected between each transformer 12 and converter 14. A simplified RMS to DC converter is shown in FIG. 7. The RMS to DC converters 14 include a first fixed resistor 30, a first forward biased diode junction 32, an operational amplifier (commonly referred to as an op-amp) 34, a second resistor 35, a second forward biased diode junction 36, and a low pass filter 38. All components of the converter 14 are well known and widely used in the art, and thus will not be described in detail. Because all current transformers 12 are connected to a converter 14 in an identical manner, the connections will be discussed with respect to only a single transformer 12/converter 14 arrangement.

The current transformer 12 is electrically connected to the fixed resistor 30 of the converter 14. The fixed resistor 30 is in turn connected to the forward biased diode junction 32 such that the fixed resistor 30 heat is transferred to the forward biased diode junction 32 from the fixed resistor 30 to produce a voltage change in the diode junction 32. The process of heating a diode junction to produce a voltage change is well known in the art and thus will not be further explained. The forward biased diode junction 32 is connected to the op-amp 34 such that the voltage change is transmitted from the forward biased diode junction 32 to the op-amp 34. The op-amp 34 is connected to the second resistor 35, which in turn is thermally connected to the second forward biased diode junction 36, such that the second resistor 35 and second forward biased diode junction 36 produces a DC voltage equal to the RMS voltage when in equilibrium. Again, this process is commonly known in the art. The second forward biased diode junction 36 is connected to the low pass filter 38 such that only the DC voltage is transmitted from the second forward biased diode junction 36 to the low pass filter 38.

Each converter 14, and more specifically the low pass filter 38 of each converter 14, is connected to four of the six comparators 16. Comparators 16 are circuits which compare two inputs and output a signal or value. Comparators are widely known and commonly used in the art. Comparators 16 can be any comparator circuits which can compare voltages from two inputs. As can be seen from FIG. 1, the converters 14 are connected to the comparators 16 such that the comparators 16 compare the DC equivalent of current of each phase with the DC equivalent of current of the two remaining phases. Positive and negative comparisons allow offsets to be introduced to create a deadband and check for circuitry failure. The outputs of comparators 16 are connected to the microprocessor 22 such that the output of each comparator 16 is transmitted to the microprocessor 22.

The microprocessor 22 is connected to both zero-crossing detectors 20, 21 and the phase triggers 18. The microprocessor 22 and zero-crossing detectors are connected in such a manner as to allow a signal to be transferred from the zero-crossing detectors 20,21 to the microprocessor 22. The microprocessor 22 and phase triggers 18 are connected in such a manner as to allow the microprocessor 22 to transfer information to the phase triggers 18. Each phase trigger 18 is also connected to the power source 40. When connected, the power source 40 can deliver a current to each phase trigger 18. If connected to a motor 50, each phase trigger 18 can deliver this current to the motor 50, as will be explained in more detail below.

The phase triggers 18 are connected to motor 50 via outputs 42. The output 42 is any device capable of transferring a voltage from phase trigger 18 to motor 50. Many such devices, such as electrical wire, are well known and commonly used in the art. Each phase trigger controls the firing of a motor 50 according to a phase of the power source 40. Specifically, two phase triggers 18 control the powering of a motor based on input regarding a single phase of the power source 40, each phase trigger 18 being associated with the same phase of the power source 40. One phase trigger 18 controls the powering of the motor 50 for all positive current values of the phase and the other phase trigger 18 controls powering of the motor 50 for all negative current values of the phase.

In a typical three-phase power source, each phase has two firing points in each cycle at which the phase is powered. Each of these firing points is at a zero-crossing of the phase. Therefore, each phase has two phase triggers 18 connected to it, each phase trigger 18 powering the phase at one of the zero-crossing points. In the preferred embodiment there are six phase triggers 18, two for each of the three phases of the power source 40. Phase triggers are commonly used in the art, and any conventional phase triggers can be used. For example, the phase triggers may be thyristors, SCRs, triacs or other phase control switches.

As is widely understood in the art, only one of the two phase triggers 18 controlling a single phase of the power source will operate at any given time. This is because, a phase trigger 18 that controls a motor 50 during positive current values is inoperative when the phase has negative current values. Similarly, a phase trigger 18 that controls a motor 50 during negative current values of a phase is inoperative when that phase has positive current values. It will be readily understood by those skilled in the art that the positive and negative phase triggers 18 for each phase can be incorporated into a single device, such as a back-to-back SCR. If such a device is used, the entire device will be powered when the controller encounters either of the two zero-crossing points of the phase. Because each phase trigger 18 can operate during only one of the positive half cycle and negative half cycle of the phase, only one phase trigger 18 will fire for each zero-crossing point.

In operation, each of the three phase inputs 24 transfers a current to one of the three current transformers 12. Each current transformer 12 translates the current received from the appropriate phase input 24 into an AC voltage. Methods of converting a current to an AC voltage are well known in the art, and therefore the process will not be discussed further.

Each current transformer 12 feeds the first fixed resistor 30 that is part of the RMS to DC converter 14. The resistors 30 then heat the first forward biased diode junctions 32. The variation in diode junction temperature changes the forward voltage characteristic of the diode. The voltage change across the junction 32 is presented to the input of the operational amplifier 34. The amplifier 34 drives the second resistor 35, which in turn heats the second forward biased diode junction 36. The second forward biased diode junction 36 matches the input voltage with a DC voltage. The DC voltage is the equivalent to the input voltage. This DC voltage is transmitted to the low pass filter 38 to remove ripple.

After being filtered, the voltage is presented to comparators 16 which compare the outputs of the three phases. The resulting A<B–B>A, A<C–C>A, and B<C–C>B comparisons are input to the microprocessor 22. The microprocessor 22 implements the dead band function by accumulating repetitive comparisons over time, as will be explained in more detail below. This allows a simple offset to each comparator 16 to implement the dead band function.

Specifically, upon receiving a signal from the zero-crossing detector 20 that the phase being monitored has encountered a positive zero-crossing point (meaning the current values are positive after zero crossing), the microprocessor 22 uses the values received from the comparators 16 to calculate an appropriate adjustment in time for each phase trigger 18 to fire at each of the remaining five firing points in the cycle. Although the time for the first phase trigger 18, and its complement trigger 18 associated with the same phase, to fire can only be delayed, the firing times for the remaining four phase triggers 18 can be delayed or accelerated resulting in the relative acceleration of the first phase trigger 18.

The time difference between the voltage zero-crossing detector 21 and the current zero-crossing detector 20 allows the microprocessor 22 to calculate the power factor, and hence the relative loading of the motor. When the power factor is less than a target power factor all phase triggers 18 are incrementally delayed to reduce the voltage presented to the motor until the target is reached. The delay is preferably a multiple of 50 microseconds. Alternatively, the delay can be calculated based on the difference between the measured power factor and the acceptable range of values. This gross voltage reduction is fine-tuned for voltage balance by the comparator scheme. Any reference to the measurement of power factor included herein should be interpreted to include not only actual measurement of power factor, but also measurement of values representative of power factor, such as the timing delay between current and voltage.

Basically, the microprocessor 22 calculates the delay value for a single phase using the input received and uses the frequency of the system to calculate the remaining firing delays. Assuming there are six firing points, the timing of the firing points can be calculated simply using the equation 1/(frequency*6). For example, in a 60 Hz system 1/(60*6) or 0.00278. Therefore, after delaying the appropriate time for the first phase trigger 18 the system fires one of the phase triggers 18 every 0.00278 seconds. The entire process is repeated every time a positive zero crossing point is detected by the zero crossing detector 20.

The functioning of the microprocessor 22 will now be described in greater detail. The microprocessor 22 can be any microprocessor capable of performing the calculations described herein and transmitting the appropriate information to the phase triggers 18. Many conventional microprocessors exist that are acceptable, as will be readily recognized by those skilled in the art. In discussing this process, the three phases will be referred to as phases A, B and C.

If A phase is the highest of the three phases, the microprocessor software increments the value in a memory location. The register range is 0 to 15. Over time a register value of 15 will indicate that A is sufficiently larger than B and C to adjust the balance. If the A phase was no longer the smallest non zero values in the register would be decremented until zero then a memory location for the B or C phase would be incremented. The resulting comparisons result in three register values which will each go to a minimum or a maximum value when an imbalance exists. In the current embodiment 15 steps were determined adequate for deadband. Alternate embodiments will have different values determining the deadband response.

Each of the three register values are kept in three arrays. The length of each array corresponds to the number of delay steps possible for energy reduction from the power factor scheme. In order for an array value to be updated the energy delay step must remain at a particular step location long enough for the analog front-end circuitry to settle. Comparator results for a particular step that is not maintained for a sufficient period of time are ignored.

The section of the array above indicates that at the particular step 22 above A is greater than B and greater than C by an amount sufficient to reduce the relative A phase voltage. Steps 11 to 17 were not maintained for a period long enough to evaluate. When an array value reaches 15 the software resets the value to 0 and adjusts individual phase delays.

The individual phase delays are maintained in three arrays. The length of these arrays corresponds to the possible delay steps as above. If for example A is greater than B and C the delay values for B and C are reduced by one count each for the current step. If either B or C is zero then the A count is increased by one. In this way the firing of the phase A phase trigger 18 is delayed relative to the other two phases to reduce the voltage presented to the motor 50 from that particular phase.

|  | 11 | 12 | 13 | 14 | 15 | 16 | 17 | 18 | 19 | 20 | 21 | 22 | 23 | 24 |
|---|---|---|---|---|---|---|---|---|---|---|---|---|---|---|
| A delay values | 29 | 27 | 25 | 23 | 22 | 21 | 20 | 18 | 16 | 16 | 15 | 15 | 12 | 11 |
| B delay values | 0 | 0 | 0 | 0 | 0 | 0 | 0 | 0 | 0 | 0 | 0 | 0 | 0 | 0 |
| C delay values | 0 | 0 | 0 | 0 | 0 | 0 | 0 | 0 | 0 | 0 | 0 | 0 | 0 | 0 |

In the above array values for delay for phase A are calculated based on a weighted look up table for the possible delays. The delay amounts are multiplied by the value in the corresponding look up table. These values above and below are recalculated when the array table for a step is changed. This is necessary to provide smooth offset adjustment over the operating range. Rapid load changes preclude settling in some delay values so interpolation is required.

The look up table is fixed and is based on calculations for adjustment over the possible delay steps. The table length is 1024 (1 k) in length and stored in program memory The timing resolution is 50 microseconds. The starting point for determining what point is to be used in the table is determined by measuring the time from voltage zero crossing to current zero crossing+energy delay time.

Figure 9:
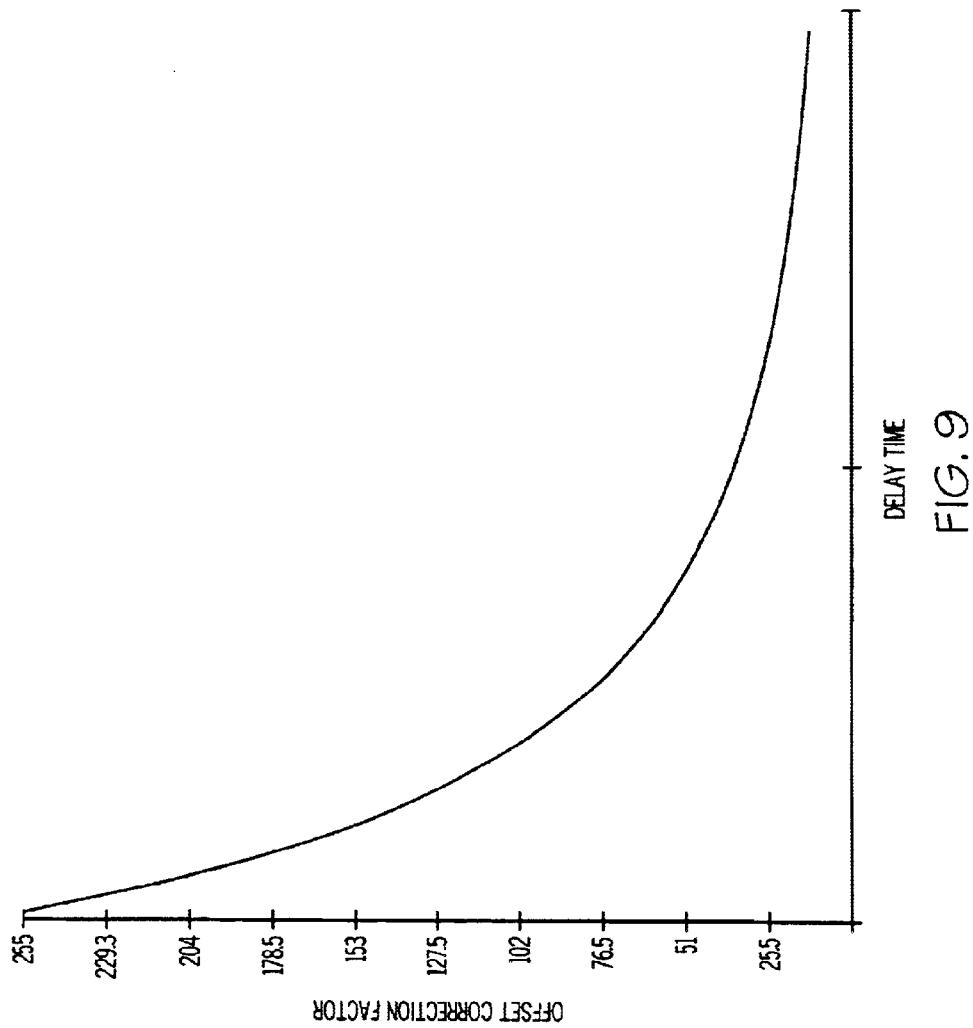
FIG. 9 is a graph of offset correction factors versus delay times.

FIG. 9 indicates the relative correction factors for offsets at various points along the delay curve. As an example if the delay time u across the bottom of the graph is selected for a particular delay value the Y-axis intercept is 50. Points above and below this delay are multiplied by the $gain_u$ value divided by 50 multiplied by the offset value. The offset voltage adjustment during each 3-phase cycle utilizes these values to add delay to a particular phase. The amount of offset delay added to a particular phase firing point is subtracted from the delay to the next phase firing point. This

| DELAY | 11 | 12 | 13 | 14 | 15 | 16 | 17 | 18 | 19 | 20 | 21 | 22 | 23 | 24 |
|---|---|---|---|---|---|---|---|---|---|---|---|---|---|---|
| A is largest | 0 | 0 | 0 | 0 | 0 | 0 | 0 | 7 | 8 | 10 | 0 | 15 | 9 | 7 |
| B is largest | 0 | 0 | 0 | 0 | 0 | 0 | 0 | 0 | 0 | 0 | 0 | 0 | 0 | 0 |
| C is largest | 0 | 0 | 0 | 0 | 0 | 0 | 0 | 0 | 0 | 0 | 0 | 0 | 0 | 0 | maintains the delay intervals between the 3 phases. Timing resolution for the offset adjustment is 5 microseconds.

The above description is that of preferred embodiments of the invention. Various alterations and changes can be made without departing from the spirit and broader aspects of the invention as defined in the appended claims, which are to be interpreted in accordance with the principles of patent law including the doctrine of equivalents. Any reference to claim elements in the singular, for example, using the articles "a," "an," "the" or "said," is not to be construed as limiting the element to the singular.

The embodiments of the invention in which an exclusive property or privilege is claimed are defined as follows:

1. A method for controlling multi-phase power comprising the steps of:
    measuring a zero-crossing point of a single phase of a multi-phase power system;
    calculating a timing of phase triggers for all phases based on the single phase measurement;
    firing the phase triggers for all phases based on the calculated timing;
    measuring a power factor of the multi-phase power;
    determining whether the power factor is within predetermined limits;
    introducing a delay into the timing of the phase triggers for all phases if the power factor is not within the predetermined limits; and
    measuring a value for each phase on a supply side;
    comparing the measured values; and
    adjusting the timing of one or more of the phase triggers as a function of the results of said comparing step to account for imbalances in the supply lines.

2. The method of claim 1, further comprising the step of converting a current for each phase into a voltage and comparing the voltages of the different phases of the multi-phase power.

3. The method of claim 2, wherein said step of measuring a zero-crossing point of a first phase is performed by a zero-crossing detector.

4. The method of claim 3, wherein said step of calculating a timing of phase triggers is performed by a microprocessor.

5. The method of claim 4, wherein said step of introducing a delay into the timing of all phase triggers includes the step of introducing a fixed delay into the timing of each phase trigger.

6. A method for controlling a three phase power system, comprising the steps of:
    measuring a zero-crossing point of a first phase of a three phase power system;
    calculating a timing sequence of phase triggers for all three phases of the system based on the first phase measurement;
    measuring a voltage for each phase on a supply side;
    comparing the measured voltages; and
    adjusting the timing of at least one of the phase triggers as a function of the comparison of the measured voltages;
    firing the phase triggers for all phases based on the timing sequence;
    determining whether power factor of the three phase power is within predetermined limits; and
    introducing a delay into the timing sequence of the phase triggers for all phases if the power factor is not within the predetermined limits.

7. The method of claim 6, wherein said comparing the measured voltages step is performed by a plurality of comparators.

8. The method of claim 7, wherein said steps of calculating the timing of the phase triggers and adjusting the timing of at least one of the phase triggers is performed by the microprocessor.

9. The method of claim 8, wherein said step of determining whether power factor is within predefined limits includes the steps of:
    measuring a timing of a zero-crossing of the voltage of one phase of said three-phase power;
    measuring a timing of a zero-crossing of the current of one phase of said three-phase power;
    calculating a difference between the measured timing of the zero-crossing of the voltage with the measured timing of the zero-crossing of the current; and
    comparing the calculated difference with a stored value.

10. A power control system for controlling three phase power applied to a three phase motor comprising:
    a plurality of phase triggers, at least one phase trigger connection in series on each phase between a supply of power and said motor;
    a microprocessor connected to said phase triggers to control said power supplied to the motor by varying the firing times of said phase trigger; and
    a voltage zero-crossing detector connected between one phase of said power and said microprocessor, said microprocessor being programmed to calculate said firing times for all phase triggers of all phases based on an input of said voltage zero-crossing detector;
    a current zero-crossing detector connected between one phase of said power and said microprocessor, said microprocessor being programmed to calculate a first delay in said firing times for all phase triggers based on inputs of said voltage zero-crossing detector and said current zero-crossing detector;
    a phase balance circuit for balancing voltage between all phases; and
    a plurality of comparators arranged to compare each phase of said power with each other phase of said power, an output of each comparator being connected to an input of said microprocessor, said microprocessor being programmed to calculate a balancing delay in said firing times based on inputs from said comparators.

* * * * *